(12) United States Patent
Matsuike et al.

(10) Patent No.: US 9,165,392 B2
(45) Date of Patent: Oct. 20, 2015

(54) IMAGE GENERATING DEVICE, IMAGE GENERATING METHOD, AND NON-TRANSITORY INFORMATION STORAGE MEDIUM

(75) Inventors: Hiroshi Matsuike, Tokyo (JP); Junichi Hosono, Tokyo (JP); Tomohito Ito, Kanagawa (JP); Hitoshi Ishikawa, Tokyo (JP)

(73) Assignees: SONY COPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 216 days.

(21) Appl. No.: 13/489,564

(22) Filed: Jun. 6, 2012

(65) Prior Publication Data

US 2012/0313931 A1 Dec. 13, 2012

(30) Foreign Application Priority Data

Jun. 7, 2011 (JP) ................................. 2011-127376

(51) Int. Cl.
*G06T 13/40* (2011.01)
*G06T 13/80* (2011.01)
(52) U.S. Cl.
CPC .................. *G06T 13/40* (2013.01); *G06T 13/80* (2013.01)
(58) Field of Classification Search
USPC .......................................... 345/419, 473, 474
See application file for complete search history.

(56) References Cited

U.S. PATENT DOCUMENTS

| 8,023,619 B2 * | 9/2011 | McNabb et al. ............. 378/106 |
| 2006/0262113 A1 * | 11/2006 | Leprevost .................... 345/419 |
| 2006/0274068 A1 | 12/2006 | Barthelet |
| 2010/0182329 A1 * | 7/2010 | Yamaguchi et al. .......... 345/474 |
| 2010/0207949 A1 * | 8/2010 | Spencer ....................... 345/473 |
| 2011/0222727 A1 * | 9/2011 | Sharma ........................ 382/103 |

FOREIGN PATENT DOCUMENTS

JP 4-270470 9/1992

OTHER PUBLICATIONS

Erin Catto, et al. "Fast and Simple Physics using Sequential Impulses" Game Developers Conference 2006.
Japanese Office Action dated May 7, 2013, from corresponding Japanese Application No. 2011-127376.
Okawa Yoshikuni, "DirectX9, 3D game programming vol. 2", Kohgaku-Sha Co., Ltd. Jul. 25, 2003, pp. 176-177.

* cited by examiner

*Primary Examiner* — Mark Zimmerman
*Assistant Examiner* — Yu-Jang Tswei
(74) *Attorney, Agent, or Firm* — Katten Muchin Rosenman LLP

(57) ABSTRACT

Provided is an image generating device for generating an image of an object including a plurality of elements connected to one another. The image generating device includes: a calculating section for iteratively calculating a motion of each element of the plurality of elements based on a physical constraint condition of the each element with respect to another connected element; a parent-child information acquiring section for acquiring parent-child information corresponding to a connection between the each element and the another element based on information indicating an element having a predetermined relationship with another object; a correcting section for correcting a position of a child element with respect to a parent element based on the parent-child information and the motion of the each element; and an image generating section for generating information on the image of the object based on the corrected position of the each element.

7 Claims, 8 Drawing Sheets

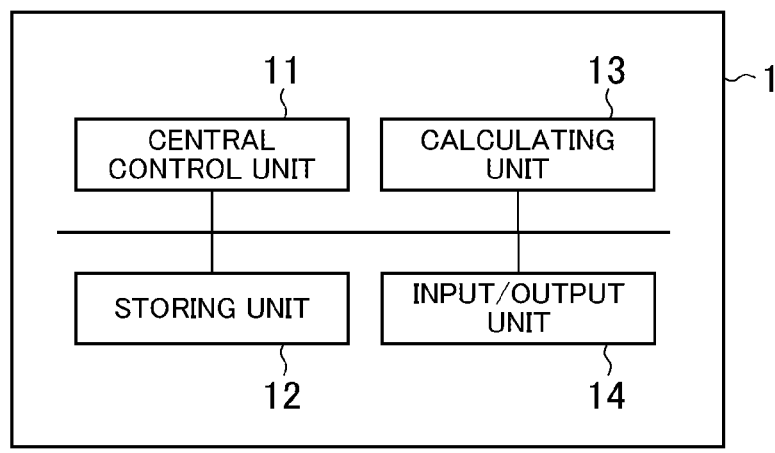
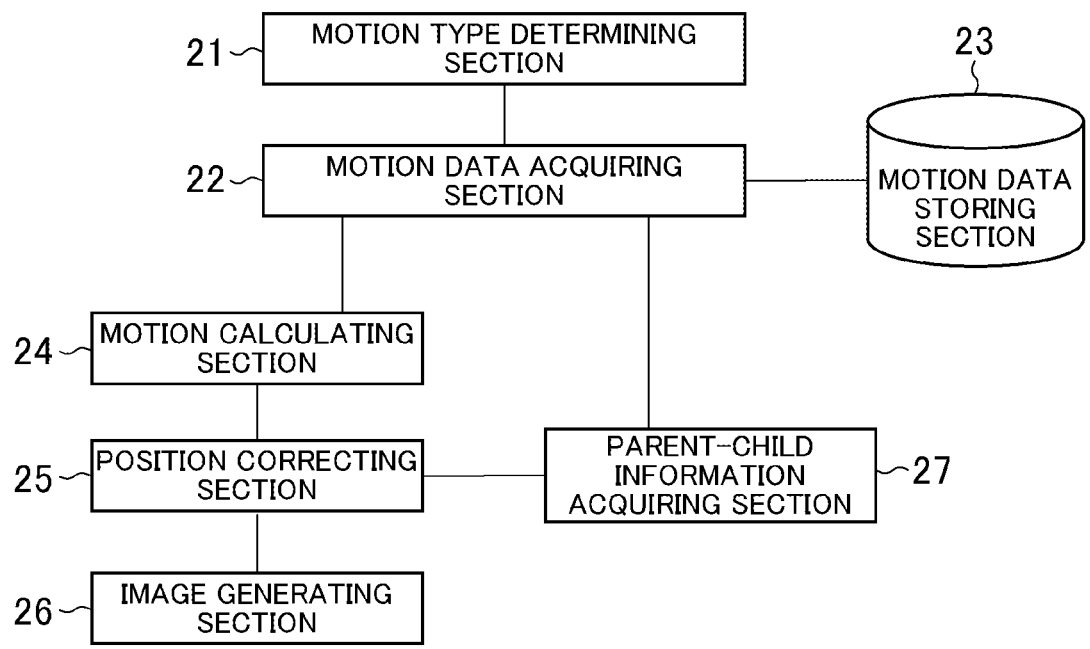

| No | PARENT | CHILD |
|---|---|---|
| 1 | r6 | r5 |
| 2 | r5 | r2 |
| 3 | r2 | r1 |
| 4 | r2 | r3 |
| 5 | r3 | r4 |
| 6 | r2 | r7 |
| 7 | r7 | r8 |
| 8 | r2 | r9 |
| 9 | r9 | r10 | ized
IMAGE GENERATING DEVICE, IMAGE GENERATING METHOD, AND NON-TRANSITORY INFORMATION STORAGE MEDIUM

CROSS-REFERENCE TO RELATED APPLICATION

The present application claims priority from Japanese application JP2011-127376 filed on Jun. 7, 2011, the content of which is hereby incorporated by reference into this application.

BACKGROUND OF THE INVENTION

1. Field of the Invention

The present invention relates to an image generating device, an image generating method, and an information storage medium.

2. Description of the Related Art

For a multi-body object including a plurality of elements connected to one another as in a chain, for example, there is known a technology of simulating a motion of, and generating an image of, the multi-body object. In order to take into consideration the interaction among the plurality of elements included in the multi-body object, the motion is calculated by an iterative method such as the Gauss-Seidel method or the impulse method.

When the motion of the multi-body object including the plurality of elements connected to one another is calculated by the iterative method, the generated image may become unnatural in some cases due to reasons such as a strong force or acceleration applied to an element.

SUMMARY OF THE INVENTION

The present invention has been made in view of the above-mentioned problem, and therefore has an object to provide a technology capable of generating a natural image even when a strong force or acceleration is applied to an element.

In order to solve the above-mentioned problem, according to an exemplary embodiment of the present invention, there is provided a computer-readable information storage medium having stored thereon a program for causing a computer to execute processing of generating an image of an object including a plurality of elements connected to one another, the program causing the computer to execute the processing of: iteratively calculating a motion of each element of the plurality of elements based on a physical constraint condition of the each element with respect to another element of the plurality of elements connected to the each element; acquiring parent-child information corresponding to a connection between the each element and the another element, with one of the each element and the another element being a parent element and another one thereof being a child element based on information indicating an element having a predetermined relationship with another object; correcting a position of the child element with respect to the parent element based on the parent-child information and the motion of each of the plurality of elements; and generating information on the image of the object based on the corrected position of each of the plurality of elements.

Further, according to an exemplary embodiment of the present invention, there is provided an image generating device for generating an image of an object including a plurality of elements connected to one another, including: calculating means for iteratively calculating a motion of each element of the plurality of elements based on a physical constraint condition of the each element and another element of the plurality of elements connected to the each element; parent-child information acquiring means for acquiring parent-child information corresponding to a connection between the each element and the another element, with one of the each element and the another element being a parent element and another one thereof being a child element based on information indicating an element having a predetermined relationship with another object; correcting means for correcting a position of the child element with respect to the parent element based on the parent-child information and the motion of each of the plurality of elements; and image generating means for generating information on the image of the object based on the position of each of the plurality of elements corrected by the correcting means.

Further, according to an exemplary embodiment of the present invention, there is provided an image generating method for generating an image of an object including a plurality of elements connected to one another, including: iteratively calculating a motion of each element of the plurality of elements based on a physical constraint condition of the each element and another element of the plurality of elements connected to the each element; acquiring parent-child information corresponding to a connection between the each element and the another element, with one of the each element and the another element being a parent element and another one thereof being a child element based on information indicating an element having a predetermined relationship with another object; correcting a position of the child element with respect to the parent element based on the parent-child information and the motion of each of the plurality of elements; and generating information on the image of the object based on the position of each of the plurality of elements corrected by the correcting.

According to the present invention, it is possible to generate an image naturally even when a strong force or acceleration is applied to an element.

In the exemplary embodiment of the present invention, the processing of correcting a position of the child element with respect to the parent element may include correcting the position of the child element with respect to the parent element so that a position of a joint included in the parent element with respect to the child element and a position of a joint included in the child element with respect to the parent element satisfy a predetermined condition based on the parent-child information and the motion of the each element.

In the exemplary embodiment of the present invention, the processing of correcting a position of the child element with respect to the parent element may include correcting the position of the child element when a distance between the position of the joint included in the parent element with respect to the child element and the position of the joint included in the child element with respect to the parent element is larger than a predetermined threshold.

In the exemplary embodiment of the present invention, the processing of correcting a position of the child element with respect to the parent element may include correcting the position of the child element, when a distance between the position of the joint included in the parent element with respect to the child element and the position of the joint included in the child element with respect to the parent element is larger than a predetermined threshold, so that the distance becomes the predetermined threshold.

In the exemplary embodiment of the present invention, the computer-readable information storage medium of the present invention may store the program further causing the computer to execute the processing of determining a motion type of the object at a time of calculation, the motion type indicating the element having the predetermined relationship with the another object, in which the processing of acquiring parent-child information may include acquiring the parent-child information based on the determined motion type.

In the exemplary embodiment of the present invention, the parent-child information acquiring means may include acquiring the parent-child information based on the determined motion type and an elapsed time for which the motion type is determined.

BRIEF DESCRIPTION OF THE DRAWINGS

In the accompanying drawings:

FIG. 1 is a diagram illustrating a configuration of an image generating device according to an embodiment of the present invention;

FIG. 2 is a functional block diagram of the image generating device according to the embodiment of the present invention;

DETAILED DESCRIPTION OF THE INVENTION

Figure 3:
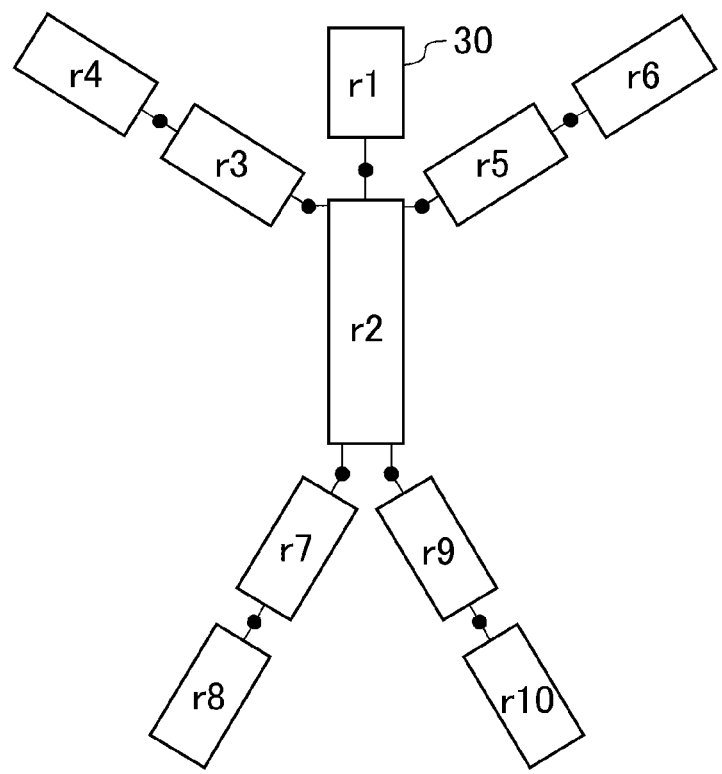
FIG. 3 is a diagram illustrating an example of an object to be physically simulated in a frame.

Hereinafter, an embodiment of the present invention is described with reference to the accompanying drawings. FIG. 1 is a diagram illustrating a configuration of an image generating device 1 according to the embodiment of the present invention. The image generating device 1 includes a central control unit 11, a storing unit 12, a calculating unit 13, and an input/output unit 14. The image generating device 1 is a device having a function of generating a three-dimensional image, as exemplified by a personal computer or a consumer game machine.

The central control unit 11 operates in accordance with a program stored in the storing unit 12 and controls the calculating unit 13 and the input/output unit 14. Note that, the above-mentioned program may be provided by being stored in a computer-readable information storage medium such as a DVD-ROM, or may be provided via a network such as the Internet.

The storing unit 12 includes a memory element such as a RAM or a ROM, a hard disk drive, and the like. The storing unit 12 stores the above-mentioned program. The storing unit 12 also stores information input from the respective units and operation results.

The calculating unit 13 has a function of performing arithmetic operation such as floating-point calculation at high speed. The calculating unit 13 operates in accordance with the program stored in the storing unit 12 and outputs the calculation result to the storing unit 12 and the input/output unit 14.

The input/output unit 14 includes means for controlling a display output device such as a monitor, means for controlling an input device such as a mouse, and the like. The input/output unit 14 outputs image data and the like to the display output device and acquires information from an operator through the input device under control of the central control unit 11.

FIG. 2 is a functional block diagram of the image generating device according to the embodiment of the present invention. The image generating device 1 functionally includes a motion type determining section 21, a motion data acquiring section 22, a motion data storing section 23, a motion calculating section 24, a position correcting section 25, an image generating section 26, and a parent-child information acquiring section 27. Those functions are implemented by the central control unit 11 and the calculating unit 13 executing the program stored in the storing unit 12 and controlling the input/output unit 14.

FIG. 3 is a diagram illustrating an example of an object to be physically simulated in a frame. The object is constituted of a plurality of ragdolls (elements) 30 connected to one another when a motion is calculated. The image generating device 1 according to this embodiment simulates a motion of the object (more specifically, velocity, angular velocity, position, angle, and the like of each ragdoll 30 of the object) in a frame by calculation and generates an image of the object based on the motion. Note that, FIG. 3 illustrates an example of an object that emulates a human body. The ragdolls 30 illustrated in FIG. 3 are given IDs of r1 to r10 for use in processing.

Figure 4:
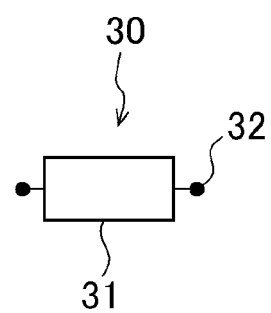
FIG. 4 is a diagram illustrating an example of a configuration of one element.

FIG. 4 is a diagram illustrating an example of a configuration of one ragdoll 30. Each ragdoll 30 includes one ragdoll body 31 and at least one joint 32. The ragdoll body 31 has a shape of a cuboid, a circular cylinder, or the like. The joint 32 is a part to be connected to a joint 32 included in another ragdoll 30 and is represented by a dot in the example of FIG. 4. One ragdoll 30 interacts with other ragdolls 30 in terms of a force and the like via the joint 32. In a ragdoll 30, positions of the joints 32 with respect to the ragdoll body 31 are predetermined, and the positional relationships are represented in the figure by the lines connecting the joints 32 and the ragdoll body 31. Each ragdoll 30 has, as physical quantities for performing physical calculation, parameters such as a mass, an inertia moment, the velocity, the angular velocity, the position, and an angle. The image generating device 1 uses information of the calculated positions, angles, and the like of the ragdolls 30 to generate the image of the object.

Figure 5:
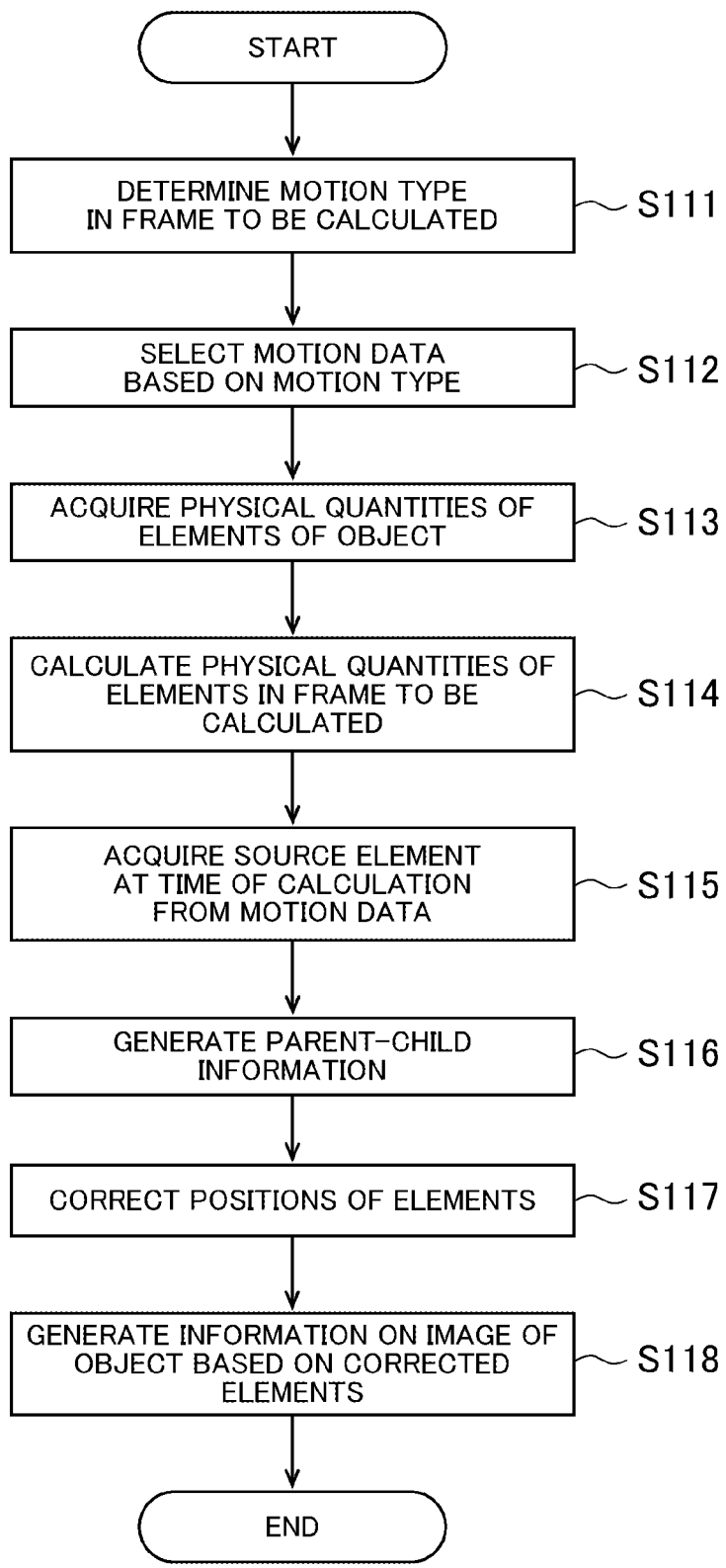
FIG. 5 is a diagram illustrating an example of a processing flow of the image generating device according to the embodiment of the present invention.

Hereinafter, processes of the functions of the image generating device 1 are described in order of the processes. FIG. 5 is a diagram illustrating an example of a processing flow of the image generating device 1 according to the embodiment of the present invention.

The motion type determining section 21 is implemented mainly by the central control unit 11, the storing unit 12, and the input/output unit 14. The motion type determining section 21 acquires a motion type at the time of calculation (frame to be calculated) (Step S111). Motions of the object are classified in advance into motion types such as "hang by the right hand", "hang by the left hand", "jump", and "blown by collision on the back". The motion type determining section 21 determines one motion type from a plurality of predetermined motion types based on information acquired from a user operating the input device via the input/output unit 14, and a result of collision judgment and proximity judgment with respect to another object (for example, wall or ceiling) in the immediately preceding frame. In this case, for example, the motion type "hang by the right hand" indicates that the right hand is connected to another object, and the motion type "blown by collision on the back" indicates that the back collides. The motion type indicates a ragdoll 30 having a relationship with another object, that is, which ragdoll 30 is connected to another object or which ragdoll 30 collides.

The motion data storing section 23 is implemented mainly by the storing unit 12. The motion data storing section 23 stores a plurality of pieces of motion data (also referred to as motion data) for the object to be calculated. The motion data is stored in association with the determined motion type and an elapsed time from the start of a motion of the motion type. Each piece of the motion data indicates an arrangement of the ragdolls 30 of the object for the associated motion type at the elapsed time. The arrangement of the ragdolls 30 indicated by the motion data is a reference arrangement and is information for reflecting physical laws and generating a motion that is not caused by an external force on the ragdolls 30. The motion data contains reference information on the position (reference position) and the angle (reference angle) of each of the ragdolls 30. The motion data also contains information indicating a parent-child relationship among the ragdolls 30 at the associated elapsed time. Details on the method of generating the motion that is not caused by the external force based on the reference position, the parent-child relationship, and the correction are described later.

The motion data acquiring section 22 is implemented mainly by the central control unit 11, the storing unit 12, and the calculating unit 13. The motion data acquiring section 22 acquires one piece of motion data from the plurality of pieces of motion data stored in the motion data storing section 23 based on the motion type determined by the motion type determining section 21 and the elapsed time when the motion type is determined by the motion type determining section 21 for a plurality of frames (Step S112).

The motion calculating section 24 is implemented mainly by the central control unit 11, the storing unit 12, and the calculating unit 13. The motion calculating section 24 iteratively calculates the motion of each of the ragdolls 30 based on a physical constraint condition between the corresponding one of the ragdolls 30 and other ragdolls 30 connected to the corresponding one of the ragdolls 30. More specific processing is described. First, the motion calculating section 24 acquires physical quantities of the ragdolls 30 (Step S113). The physical quantities acquired here include the mass and the inertia moment of each of the ragdolls 30, and the position, an orientation, the velocity, and the angular velocity of each of the ragdolls 30, which are calculated in the frame immediately preceding the frame to be calculated. Next, the motion calculating section 24 calculates the physical quantities (motion) such as the position, the angle, the velocity, and the angular velocity of each of the ragdolls 30 of the object in the frame to be calculated, based on the physical constraint conditions among the ragdolls 30 (Step S114). To be more specific, the physical constraint condition as used herein refers to a condition of a positional relationship such as a distance or an angle between the joint 32 included in one of two ragdolls 30, which are connected to each other, and connected to the other ragdoll 30, and the joint 32 included in the other ragdoll 30 and connected to the one ragdoll 30. Specific examples thereof include a condition in which the distance between the above-mentioned two joints 32 is set to 0 and, in each of the two ragdolls 30, a line extending from the ragdoll body 31 to the joint 32 has an angle set within a predetermined range. Instead of the constraint condition in which the distance between the joints 32 is fixed, a constraint condition may be employed in which a force corresponding to the distance is applied between the above-mentioned two joints 32 as in a spring.

The motion calculating section 24 calculates the physical quantities of the ragdolls 30 based on a plurality of equations of motion each of which corresponds to any one of the ragdolls 30 and to which the physical constraint conditions between the corresponding ragdoll 30 and ragdolls 30 connected thereto are reflected. The equations of motion of the ragdolls 30 are expressed by the following equations.

$$F_k = \frac{dv_k}{dt} m_k$$

$$\tau_k = I_k \frac{d\omega_k}{dt} + \omega_k \times I_k \omega_k$$

[Expression 1]

where $F_k$ is a force, $\tau_k$ is a torque, $m_k$ is a mass, $I_k$ is an inertia moment, $v_k$ is a velocity vector, and $\omega_k$ is an angular velocity vector.

Note that, k is a number corresponding to the ID of each of the ragdolls 30. The force F applied on each of the ragdolls 30 is a resultant of a gravity f1, a force f2 applied from other ragdolls 30 via the joints 32, a force f3 applied depending on differences from the position and the orientation indicated by the motion data, and the like. The motion calculating section 24 acquires the velocity and the angular velocity, and further the physical quantities such as the position and the angle in the frame to be calculated from the physical quantities of the immediately preceding frame by calculating a time integration equation based on the above-mentioned equations. As a method of the time integration, there is known the Euler's method, for example.

The force f2 applied from the other ragdolls 30 depends on changes in velocity of the other ragdolls 30 caused by a force applied from the ragdoll 30 itself to the other ragdolls 30 and other such factors, and hence it is difficult to determine the exact strength of the force f2. Therefore, in this embodiment, the impulse method is used to calculate the physical quantities of the ragdolls 30. In the impulse method, the forces applied among the ragdolls 30 are expressed by iteration of minute collisions among the ragdolls 30. The force f2 applied from the other ragdolls 30 is derived based on the change in velocity due to the collisions in the joint 32. Note that, the change in velocity due to the collisions is determined by a formula in which a coefficient of restitution in the joint 32 is set to 0 and to which the momentum conservation law is further applied. The iterative calculation regarding the collisions is performed a plurality of times per frame. The number of times is predetermined in consideration of a calculation resource. The number of iterations is finite, and hence the interaction may not be reflected among the ragdolls 30 connected to each other via the number of ragdolls 30 exceeding the number of iterations.

The force f3 applied depending on the differences from the position and the orientation indicated by the motion data is a force in the direction of bringing the positions of the joints 32 of each of the ragdolls 30 closer to the reference positions of the joints 32 indicated by the motion data, and its strength becomes higher as the distance between the positions of the joints 32 and the reference positions becomes larger. The motion data includes information of the reference position and the reference angle of each of the ragdolls 30, which is used to determine the reference positions of the joints 32. Therefore, when data of a motion such as a pose is generated in advance, a motion of the object incorporating the effects of the external force and the like may be expressed.

Note that, in addition to the impulse method described above, a method may also be employed in which the time integration equation based on the equations of motion of each of the ragdolls 30 is solved by an iterative solution method. Examples of the iterative solution method include the projected Gauss-Seidel method. Note that, substantial calculations of the projected Gauss-Seidel method and the impulse method are the same. Even when the iterative solution method is used, the relationship between the number of iterations and the calculation result is the same.

Figure 6:
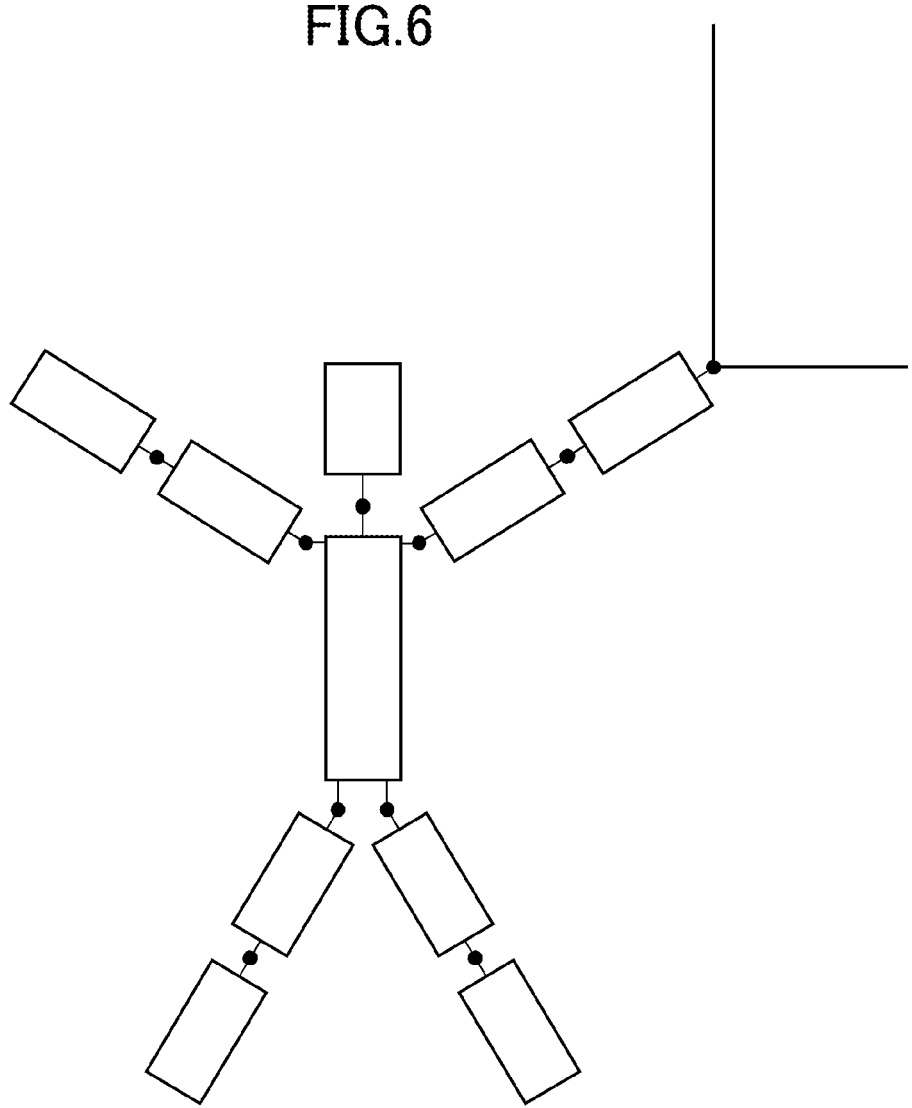
FIG. 6 is a diagram illustrating an example of an arrangement of elements of the object in a frame immediately preceding a frame to be calculated.

FIG. 6 is a diagram illustrating an example of an arrangement of the ragdolls 30 of the object in the frame immediately preceding the frame to be calculated. The motion type at this time is "hang by the right hand", and a joint 32 is provided on the distal end side of the ragdoll 30 corresponding to the right forearm and connected to a position on the surface of a moving wall. In this example, the moving wall is moving to the right at a velocity higher than a moving velocity of the object in the previous frames.

Figure 7:
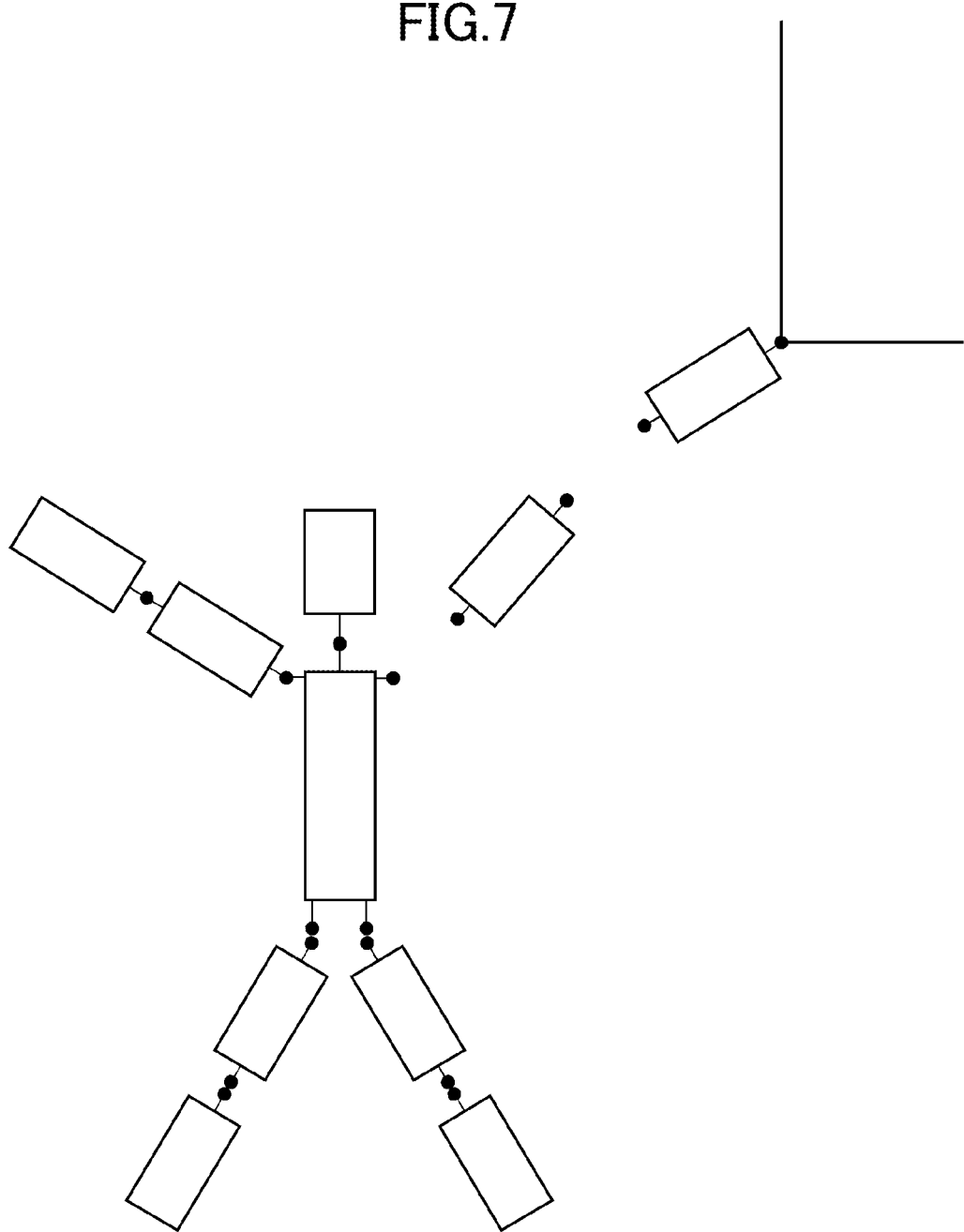
FIG. 7 is a diagram illustrating an example of an arrangement of the elements of the object indicated by physical quantities calculated by a motion calculating section.

FIG. 7 is a diagram illustrating an example of an arrangement of the ragdolls 30 of the object indicated by the physical quantities calculated by the motion calculating section 24. Under the original physical laws, a joint 32 of a ragdoll 30 and a joint 32 included in another ragdoll 30 connected thereto should be aligned. However, the force applied from the wall is not reflected in all the ragdolls 30 due to the restriction on the number of iterative calculations, resulting in misalignment of the joints 32.

The parent-child information acquiring section 27 is implemented mainly by the central control unit 11, the storing unit 12, and the calculating unit 13. The parent-child information acquiring section 27 acquires parent-child information based on the ragdoll 30 that collides with, or is connected to, another object at the time of calculation. The parent-child information corresponds to the connection between each of the ragdolls 30 and another ragdoll 30 connected to the ragdoll 30 and indicates a relationship of the two ragdolls 30 constituting each of the connections. In the relationship, one of the two ragdolls 30 is a parent ragdoll (parent element) and the other is a child ragdoll (child element). Hereinafter, a method of acquiring the parent-child information is described. In the correction to be described below, the position of the child ragdoll is corrected so that the arrangement of the parent ragdoll and the child ragdoll satisfies a predetermined condition for a connection.

First, the parent-child information acquiring section 27 acquires information indicating the ragdoll 30 which is the first parent without a parent ragdoll at the time of calculation (hereinafter, referred to as a source ragdoll) based on the motion type determined by the motion type determining section 21 (Step S115). In the correction described below, the position of the child ragdoll is corrected, and hence the position of the source ragdoll is not corrected. Therefore, the source ragdoll should be a ragdoll 30 which, when corrected, would become most unnatural for the reasons such as connection to other objects. Information on the source ragdoll is stored in advance in association with the motion type and the elapsed time in the storing unit 12, and the parent-child information acquiring section 27 acquires the source ragdoll associated with the motion type and the elapsed time from the storing unit 12. In the examples of FIGS. 6 and 7, the source ragdoll is the ragdoll 30 (ID: r6) corresponding to the right forearm, for example.

Figures 8, 9:
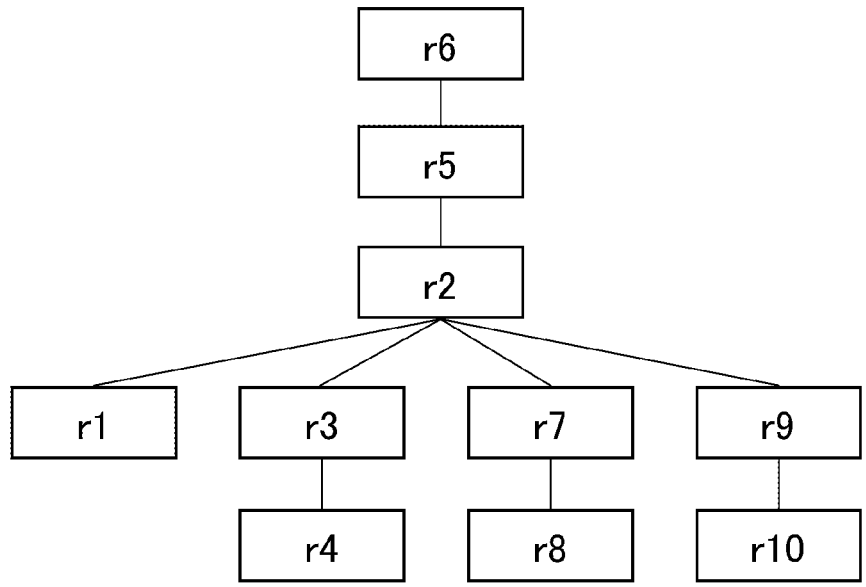
FIG. 8 is a diagram illustrating an example of a parent-child relationship in the object illustrated in FIG. 3.
FIG. 9 is a diagram illustrating an example of parent-child information.

Next, the parent-child information acquiring section 27 generates, for each connection among the ragdolls 30, the parent-child information indicating the parent-child relationship of the two ragdolls 30 connected to each other, with one of the two ragdolls 30 being the parent ragdoll and the other being the child ragdoll (Step S116). The parent-child relationship of each connection is uniquely determined when the source ragdoll is determined, unless the ragdolls are connected in loop. Therefore, the source ragdoll itself can be regarded as the information indicating the parent-child relationship. FIG. 8 is a diagram illustrating an example of the parent-child relationship in the object illustrated in FIG. 3. FIG. 8 expresses the parent-child relationship by a tree structure. The boxes in FIG. 8 indicate the ragdolls 30, and the lines connecting the boxes indicate the connections. In FIG. 8, the ragdolls 30 illustrated on the upper side of the connections are parent ragdolls, and the ragdolls 30 illustrated on the lower side are child ragdolls. FIG. 9 is a diagram illustrating an example of the parent-child information. The parent-child relationship as illustrated in FIG. 8 is expressed by the parent-child information listing combinations of IDs of the parent ragdolls and IDs of the child ragdolls.

The parent-child information illustrated in FIG. 9 may be determined by applying a known path finding algorithm, for example. Specifically, a search distance between the ragdolls 30 in each connection is first fixed to 1, and the distance of each ragdoll 30 from the source ragdoll is determined. Next, for each connection, a combination of an ID of the parent ragdoll and an ID of the child ragdoll is generated so that the ragdoll having the smaller distance from the source ragdoll is set as the parent ragdoll and the ragdoll having the larger distance is set to the child ragdoll. Note that, it is not always necessary for the parent-child information acquiring section 27 to generate the parent-child information dynamically. For example, the parent-child information may be generated in advance and stored in the storing unit 12 in association with the motion type (information) and the elapsed time. In that case, the parent-child information acquiring section 27 may directly acquire the parent-child information, instead of the information on the source ragdoll, from the storing unit 12.

The position correcting section 25 is implemented mainly by the central control unit 11, the storing unit 12, and the calculating unit 13. The position correcting section 25 corrects, based on the parent-child information and the motion of each ragdoll 30, the position of the child ragdoll with respect to the parent ragdoll so that a position of the joint 32 included in the parent ragdoll with respect to the child ragdoll and a position of the joint 32 included in the child ragdoll with respect to the parent ragdoll satisfy a predetermined condition, to thereby correct the positions of the ragdolls 30 (Step S117). The procedure of the correction is described below in detail.

First, position vectors indicating the positions of the joints 32 included in each of the ragdolls 30 are acquired. Next, the position is corrected for each connection. In this example, a position vector of the joint 32 connected to the child ragdoll and included in the parent ragdoll is denoted by Jp, and a position vector indicating the position of the joint 32 connected to the parent ragdoll and included in the child ragdoll is denoted by Jc. Then, a distance D between the vectors Jp and Jc, that is, |Jp-Jc| is determined. When the distance D exceeds a threshold θ, the position of the child ragdoll is corrected. When a vector indicating the position of the child ragdoll before correction is denoted by Ri, a vector Ri' indicating the position of the child ragdoll after the correction is expressed by the following expression.

$$Ri' \leftarrow Ri + (D-\theta)/D)(Jp-Jc)$$

Figure 10:
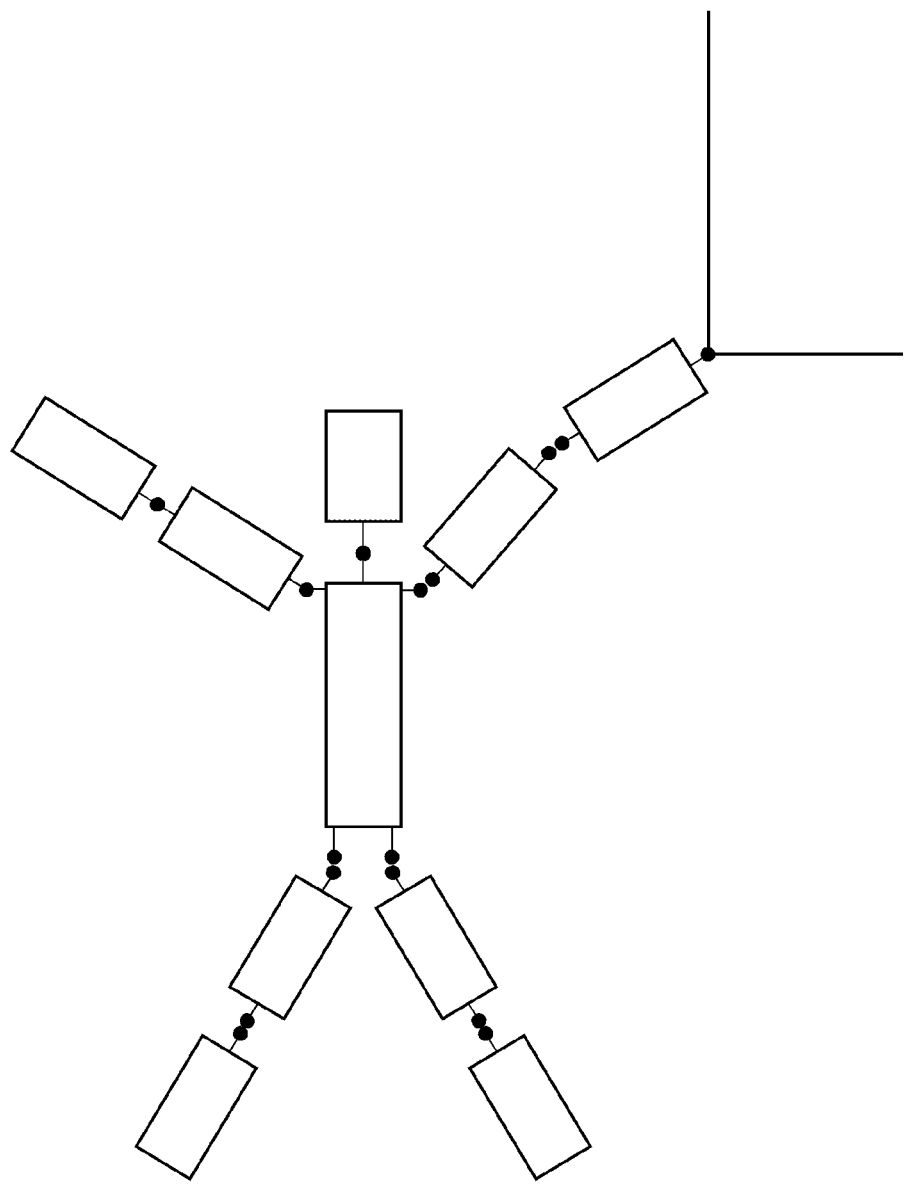
FIG. 10 is a diagram illustrating an example of a corrected arrangement of the elements of the object.

FIG. 10 is a diagram illustrating an example of a corrected arrangement of the ragdolls 30 of the object. The correction suppresses misalignment of the joints 32 connecting the two ragdolls 30. With this configuration, even when a strong force or acceleration is applied to a ragdoll 30, which would otherwise result in unnatural rendering due to the misalignment of the joints 32 when the correction is not performed, an image may be rendered naturally.

Further, in the above-mentioned correction procedure, the correction is performed only when the misalignment of the joints 32 exceeds the predetermined threshold θ. This may reduce the possibility that an inconsistency in physical quantities due to the correction is recognized. The threshold θ may be set as appropriate in advance so that the misalignment of the joints 32 becomes unnoticeable. Further, the correction is performed so that the distance between the joints 32 after the correction becomes the threshold θ. This may reduce unstable behavior caused by the correction when, for example, the distance between the joints 32 before the correction changes in the vicinity of the threshold θ as time passes.

Further, in addition to the correction of the positions of the ragdolls 30 as described above, the position correcting section 25 may correct angles of the ragdolls 30 so as to satisfy a constraint condition on the angle between the joints 32.

The image generating section 26 is implemented mainly by the central control unit 11, the calculating unit 13, the storing unit 12, and the input/output unit 14. The image generating section 26 generates information on an image of the object based on the positions of the ragdolls 30 corrected by the position correcting section 25 (Step S118). The image generating section 26 generates information on a three-dimensional image of the object based on the corrected positions and angles of the ragdolls 30 constituting the object, and outputs the generated information to a display device such as a monitor via the input/output unit 14. The display device displays the generated three-dimensional image. The procedure of generating the information on the three-dimensional image of the object is described below. The image generating section 26 first generates, from the positions and the angles of the ragdolls 30, coordinates of skeletons provided so as to correspond to the ragdolls 30. A skeleton often corresponds to the line connecting two opposing joints 32 included in the corresponding ragdoll 30. Next, the image generating section 26 generates a skin having a predetermined positional relationship with the coordinates of the skeleton, and generates information on an image of the skin. In this example, the skin consists of a plurality of polygons, which are arranged to wrap around the skeleton.

Figure 11:
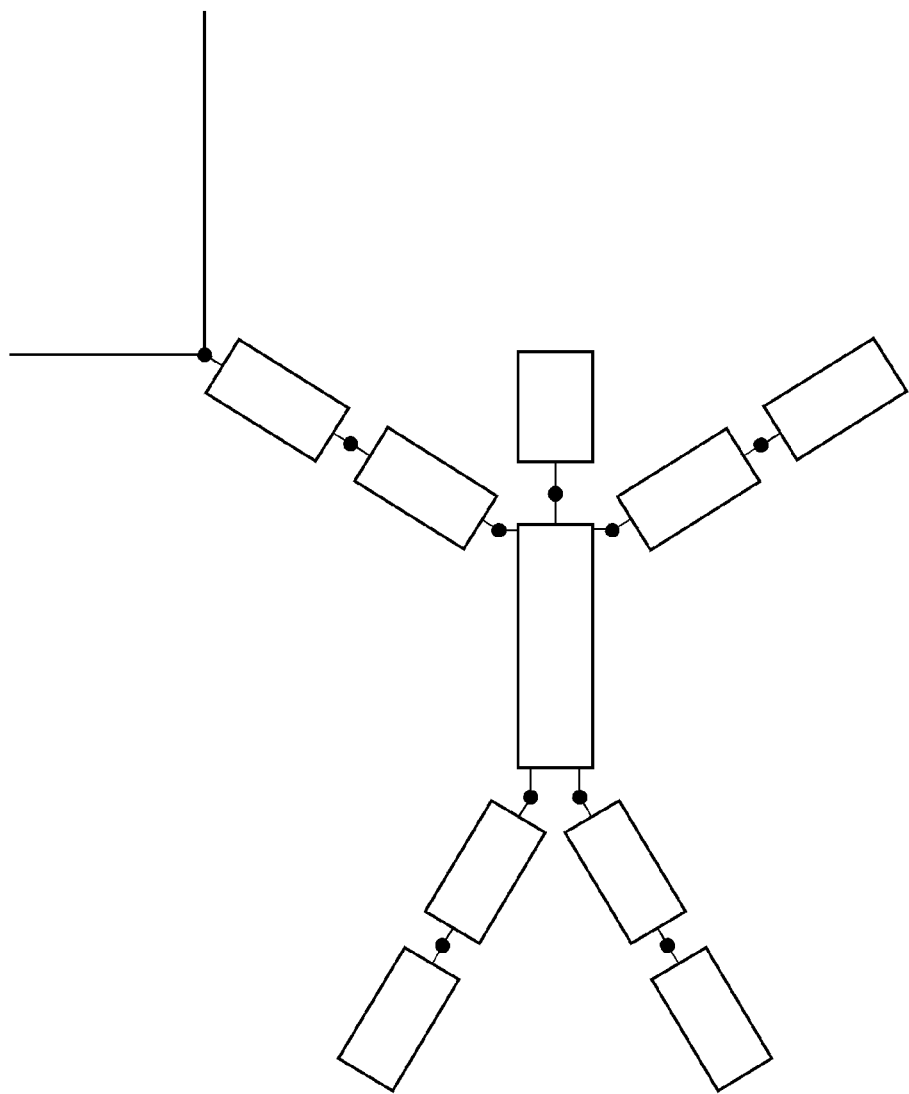
FIG. 11 is a diagram illustrating another example of the arrangement of the elements of the object in the frame immediately preceding the frame to be calculated.

The above-mentioned parent-child information acquiring section 27 changes the parent-child information by the ragdoll 30 having a predetermined arrangement relationship with another object. FIG. 11 is a diagram illustrating another example of the arrangement of the ragdolls 30 of the object in the frame immediately preceding the frame to be calculated. In the example of this figure, as opposed to the example of FIG. 6, the motion type is "hang by the left hand", and a joint 32 is provided on the distal end side of the ragdoll 30 corresponding to the left forearm and connected to the surface of a moving wall. In this case, the position where the misalignment between the joints 32 occurs and the ragdolls 30 to be rendered unnaturally when the corrected positions are shifted are different from the example of FIG. 6, but the parent-child information may be acquired accordingly. With this configuration, even when the misalignment between the ragdolls 30 that occurs when the calculation is performed by an iterative method varies depending on the ragdoll 30 that collides with, or is connected to, another object, and further the ragdoll 30 that collides or is connected changes with time, it is possible to generate an image corrected naturally depending on the ragdoll 30 that collides or is connected.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A computer-readable non-transitory storage medium having stored thereon a program for causing a computer to execute processing of generating an image of an object including a plurality of elements connected to one another, the program causing the computer to execute the processing of:

iteratively calculating a motion of each element of the plurality of elements based on a physical constraint condition of the each element with respect to another element of the plurality of elements connected to the each element;

acquiring parent-child information corresponding to a connection between the each element and the another element, with one of the each element and the another element being a parent element and another one thereof being a child element based on information indicating an element having a predetermined relationship with another object;

correcting a position of the child element with respect to the parent element based on the parent-child information and the motion of each of the plurality of elements; and generating information on the image of the object based on the corrected position of each of the plurality of elements, wherein, when a distance between the position of the joint included in the parent element with respect to the child element and the position of the joint included in the child element with respect to the parent element is less than a predetermined threshold, the predetermined distance remains the same, and wherein the processing of correcting the position of the child element with respect to the parent element comprises correcting the position of the child element, when a distance between the position of the joint included in the parent element with respect to the child element and the position of the joint included in the child element with respect to the parent element is larger than a predetermined threshold, so that the distance replaces and becomes the predetermined threshold.

2. The computer-readable non-transitory storage medium having stored thereon a program according to claim 1, wherein the processing of correcting a position of the child element with respect to the parent element comprises correcting the position of the child element with respect to the parent element so that a position of a joint included in the parent element with respect to the child element and a position of a joint included in the child element with respect to the parent element satisfy a predetermined condition based on the parent-child information and the motion of the plurality of the elements.

3. The computer-readable non-transitory storage medium having stored thereon a program according to claim 1, further causing the computer to execute the processing of determining a motion type of the object at a time of calculation, the motion type indicating the element having the predetermined relationship with the another object, wherein the processing of acquiring parent-child information comprises acquiring the parent-child information based on the determined motion type.

4. The computer-readable non-transitory storage medium having stored thereon a program according to claim 3, wherein the processing of acquiring parent-child information comprises acquiring the parent-child information based on the determined motion type and an elapsed time since the motion type is determined.

5. The computer-readable non-transitory storage medium having stored thereon a program according to claim 1, wherein correcting the position of the child element with respect to the parent element further comprises correcting the position of the child element, when an angle between the position of the joint included in the parent element with respect to the child element and the angle of the joint included in the child element with respect to the parent element is larger than a predetermined threshold.

6. An image generating device for generating an image of an object including a plurality of elements connected to one another, comprising:

calculating means for iteratively calculating a motion of each element of the plurality of elements based on a physical constraint condition of the each element and another element of the plurality of elements connected to the each element;

parent-child information acquiring means for acquiring parent-child information corresponding to a connection between the each element and the another element, with one of the each element and the another element being a parent element and another one thereof being a child element based on information indicating an element having a predetermined relationship with another object;

correcting means for correcting a position of the child element with respect to the parent element based on the parent-child information and the motion of each of the plurality of elements; and image generating means for generating information on the image of the object based on the position of each of the plurality of elements corrected by the correcting means, wherein, when a distance between the position of the joint included in the parent element with respect to the child element and the position of the joint included in the child element with respect to the parent element is less than a predetermined threshold, the predetermined distance remains the same, and wherein the processing of correcting the position of the child element with respect to the parent element comprises correcting the position of the child element, when a distance between the position of the joint included in the parent element with respect to the child element and the position of the joint included in the child element with respect to the parent element is larger than a predetermined threshold, so that the distance replaces and becomes the predetermined threshold.

7. An image generating method for generating, by a computer with a processor, an image of an object including a plurality of elements connected to one another, comprising:

iteratively calculating, using the processor, a motion of each element of the plurality of elements based on a physical constraint condition of the each element and another element of the plurality of elements connected to the each element;

acquiring parent-child information corresponding to a connection between the each element and the another element, with one of the each element and the another element being a parent element and another one thereof being a child element based on information indicating an element having a predetermined relationship with another object;

correcting a position of the child element with respect to the parent element based on the parent-child information and the motion of each of the plurality of elements; and generating and displaying information on the image of the object based on the position of each of the plurality of elements corrected by the correcting, wherein, when a distance between the position of the joint included in the parent element with respect to the child element and the position of the joint included in the child element with respect to the parent element is less than a predetermined threshold, the predetermined distance remains the same, and wherein correcting the position of the child element with respect to the parent element comprises correcting the position of the child element, when a distance between the position of the joint included in the parent element with respect to the child element and the position of the joint included in the child element with respect to the parent element is larger than a predetermined threshold, so that the distance replaces and becomes the predetermined threshold.

\* \* \* \* \*